United States Patent [19]
Antony et al.

[11] Patent Number: 5,816,116
[45] Date of Patent: Oct. 6, 1998

[54] UNIVERSAL MOUNT HOUSING CONSTRUCTION FOR RIGHT ANGLE GEARBOXES AND GEARMOTORS

[75] Inventors: Gerhard Antony; William M. Lechler; Arthur Pantelides, all of Virginia Beach, Va.

[73] Assignee: Sumitomo Machinery Corp. of America, Chesapeake, Va.

[21] Appl. No.: 864,380

[22] Filed: May 28, 1997

Related U.S. Application Data

[60] Provisional application No. 60/069,893 Dec. 13, 1996.

[51] Int. Cl.$^6$ .................................................. F16H 57/02
[52] U.S. Cl. ............................................................ 74/606 R
[58] Field of Search .................................. 74/606 R, 425

[56] References Cited

U.S. PATENT DOCUMENTS

| | | | |
|---|---|---|---|
| 1,246,930 | 11/1917 | Jenney | 74/606 R X |
| 2,734,393 | 2/1956 | Luenberger | 74/606 R X |
| 3,521,503 | 7/1970 | Jorg | 74/606 R |
| 4,986,144 | 1/1991 | Kobayashi et al. | 74/606 R |
| 5,572,906 | 11/1996 | Jorg | 74/425 |

FOREIGN PATENT DOCUMENTS

| | | | |
|---|---|---|---|
| 25 34 173 | 2/1976 | Germany | 74/606 R |
| 44663 | 3/1985 | Japan | 74/606 R |

*Primary Examiner*—Charles A. Marmor
*Assistant Examiner*—Mary Ann Battista
*Attorney, Agent, or Firm*—Jeffrey L. Thompson; Thompson & Thompson, P.A.

[57] ABSTRACT

A universal mount housing construction for right angle gearboxes and gearmotors that allows a wide variety of mounting and torque support configurations. The housing includes a generally cubic-shaped cast housing body having an input opening in a first side for receiving a rotational power input, and an output opening in at least one second side for transmitting a rotational power output through a hollow or solid output shaft. Four plate-shaped housing extensions are integrated into the cast housing member and provide two pairs of integrated torque arms. Each of the integrated housing extensions have a machined planar surface which is oriented perpendicular to the central axis of the output opening and coextensive with a raised, machined surface extending around the output opening. A through-bore extends through each of the plate-shaped housing extensions. The raised ring surface has tapped holes spaced about its circumference for flange mounting. A plurality of raised feet with tapped holes are formed on three sides of the cast housing body to provide a compact and versatile attachment of the gearbox to a driven machine.

13 Claims, 8 Drawing Sheets

UNIVERSAL MOUNT HOUSING CONSTRUCTION FOR RIGHT ANGLE GEARBOXES AND GEARMOTORS

This application claims the benefit of U.S. Provisional application Ser. No. 60/069,893, filed Dec. 13, 1996.

BACKGROUND OF THE INVENTION

1. Field of the Invention

The present invention relates generally to general purpose and industrial power transmission devices and, in particular, to a novel housing construction for gearboxes and gearmotors in the right angle configuration. The right angle housing concept described herein will allow the coverage of practically all industry standard mountings with one universal housing.

2. Background of the Invention

Gearboxes and gearmotors with right angle power transmission flow (i.e., the input and output shafts are perpendicular to each other) are widely used as preferred drive configurations in numerous industrial drive applications. To achieve a right angle power transmission flow, primarily worm, bevel and hypoid gear configurations are utilized throughout the industry.

The wide range of reduction ratios required is achieved, either in a single stage configuration of any of the type of gears mentioned above, such as by using different ratio worm gears sets, or by combining different types of gears, such as bevel with cycloidal, worm with helical, worm with spur, and so forth, together into a multiple stage unit. To have both an economical and flexible offering in such configurations, gearbox series frequently utilize combinations of a standardized modular gear set system (as the ratio sensitive portion) with a right angle stage. These standardized modular gear configuration systems are most commonly based on a spur or helical pinion and wheel combination matrix, or on other gear systems able to cover a large ratio change, such as the CYCLO® system manufactured by Sumitomo Machinery Corp. of America.

The housing of the gearboxes and gearmotors needs to be connected to the driven machinery. The connection must give adequate support primarily for the reaction torque but also for the weight forces as well as, in many applications, for the axial and radial forces from the driven machinery. The housing design needs also to provide good multiplanar alignment of the driving and driven shafts relative to each other.

The most frequently used, basic mounting configurations for gearboxes and gearmotors are:

1. Foot mount (primarily solid output shaft units);
2. Housing mount (primarily solid output shaft units, but also hollow shaft units);
3. Flange mount (both solid and hollow output shaft units); and
4. Shaft mount (hollow output shaft units with torque arm rotational constraint).

Most current housing structures are designed to allow only one or two of the above-listed mounting configurations, primarily by utilizing appropriate hardware added onto the housing by some means of mechanical attachment(s). The current housing structures, therefore, permit only a limited variety of mounting configurations and generally require additional hardware to achieve such mounting configurations. The additional mounting hardware often takes up substantial mounting space, thereby making the housing structure less compact.

Accordingly, there is a need for more versatile and compact housing constructions for gearboxes and gearmotors to allow for a wider variety of mounting and torque support configurations.

SUMMARY OF THE INVENTION

It is an object of the present invention to provide a housing construction for right angle gearboxes and gearmotors that solves the problems associated with the conventional housing constructions described above.

More specifically, it is an object of the present invention to provide a versatile housing construction for right angle gearboxes and gearmotors that allows a wide variety of mounting and torque support configurations while minimizing mounting space required.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a universal mount housing construction is provided for parallel offset gearboxes that allows a wide variety of mounting and torque support configurations. The housing construction includes a generally cubic-shaped housing body having an input opening for receiving a rotational power input and at least one output opening for transmitting a rotational power output, the output opening having a central axis which is perpendicular to a central axis of the input opening. A plurality of integrated raised feet are provided on three sides of the housing body, including a side of the housing body opposite to the input opening and perpendicular to the central axis of the input opening, and both sides of the housing body which are in planes parallel to both of the central axes of the input and output openings.

The raised feet each have a tapped bore formed therein. The tapped bores preferably provide an identical bolt hole pattern on each of the three sides of the housing body. A pair of integrated, plate-shaped housing extensions are formed on two sides of the housing body which extend in two respective planes perpendicular to the central axis of the output opening. Each of the housing extensions provide an integrated torque arm having a through-bore formed therein for attachment purposes.

A raised, machined surface is formed in the housing body around the output opening and extends to the plate-shaped housing extensions. The raised, machined surface provides a flat attachment surface. A centering bore is formed in the housing body concentric with the output opening, the centering bore providing, together with the through-bores in the plate-shaped housing extensions and the flat attachment surface, a flange type attachment. A set of tapped bores is provided in the housing body around the output opening for attaching an add-on flange arrangement.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

The present invention will now be described, by way of example, with reference to FIGS. 1 to 7 of the accompanying drawings.

The present invention features a universal mount housing construction for right angle gearboxes and gearmotors which allows a wide variety of mounting and torque support configurations, including all of the mounting and torque arm configurations described above. This is accomplished by the integrated or "designed in" features of the housing and, in some cases, by using standard added hardware, such as brackets, bolt-on feet, and so forth. The housing design approach presented here gives exceptional flexibility to the industrial gearbox/gearmotor user. At the same time, production and global inventory costs are reduced due to high volume manufacturing and subsequent stocking of only a single kind of universal housing, as described herein.

Figure 1:
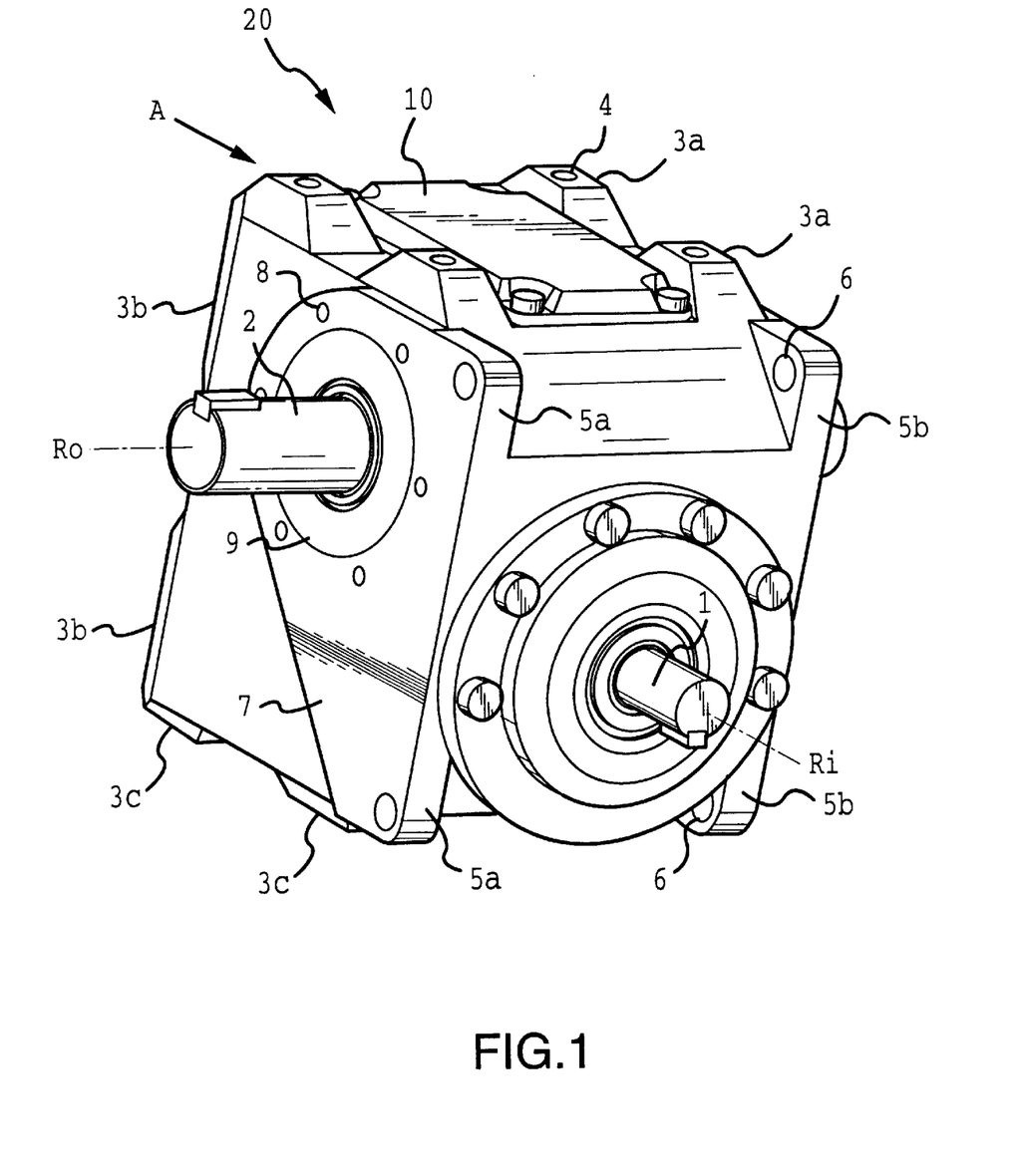
FIG. 1 is a front perspective view of a right angle gearbox having a universal mount housing according to a first embodiment of the present invention.
Figure 1A:
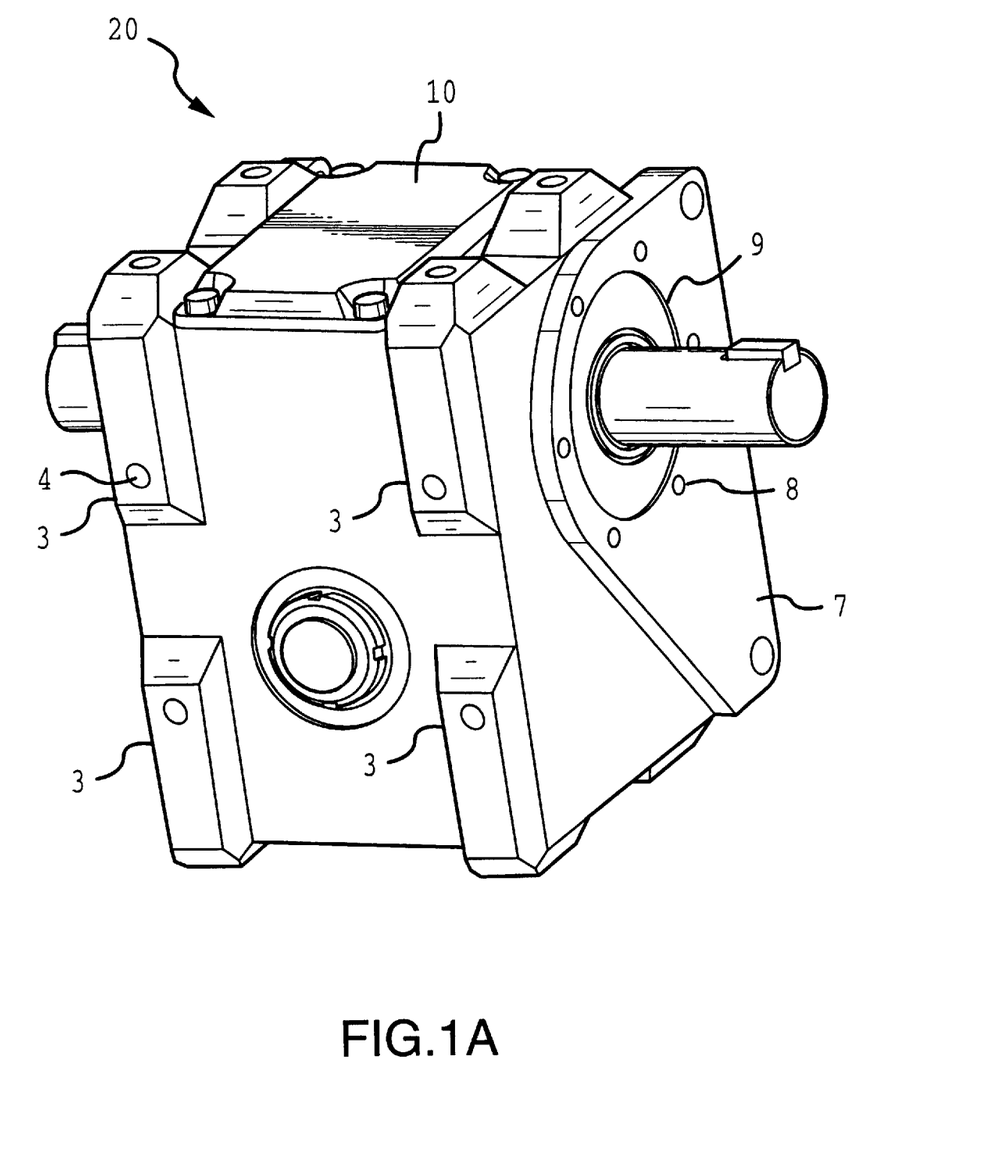
FIG. 1A is a rear perspective view of the right angle gearbox shown in FIG. 1, as viewed in the direction indicated by arrow A in FIG. 1.

FIG. 1 provides a perspective view of a right angle gearbox 20 having a universal mount housing according to a first embodiment of the present invention. The right angle gearbox 20 uses a worm gear as the right angle stage. Consequently, the center lines of the input shaft 1 and the output shaft 2 are at a right angle offset configuration.

The input can be a free standing input shaft 1, as depicted in FIG. 1, or integrated with a motor to form an integral gearmotor unit. Furthermore, the input can be combined with a primary gear stage, which can be of a helical, spur, planetary, or cycloidal type, or any other gear system. As shown in FIG. 1, an input opening having a central axis Ri is provided in the body of the housing concentric with the input shaft 1 for receiving a rotational driving force into the housing.

An output opening is provided in the body of the housing for transmitting a rotational force from the housing through the output shaft 2. The output opening of the housing has a central axis Ro, as shown in FIG. 1. The output shaft 2 can be of a hollow or solid shaft type.

The housing of the gearbox 20 maintains a cubic-shaped design with integrated sets of flat machined feet 3a, 3b, 3c at the three major mounting sides of the body of the housing. The feet 3a, 3b, 3c have tapped bores 4, which provide easy attachment of the gearbox 20 to the structure of the driven machinery. The flat machined feet 3a, 3b, 3c with the tapped bores 4 also provide an ideal attachment base for a variety of mounting brackets, base plates, torque arms, and other mounting hardware.

The housing has two sets of ears 5a and 5b with bores 6 which function as torque arm attachment locations. The torque arm attachment ears 5a and 5b are used primarily for hollow shaft mount units.

Raised machined surfaces 7 are provided on both output side faces of the body of the housing. The raised machined surfaces 7 extend around the output shaft housing bore 9 over to both ears 5a, 5b. These machined surfaces 7 around the output shaft housing bore 9 provide ideal surfaces for mounting the gearbox or gearmotor to a surface which is perpendicular to the center line of the output shaft 2.

The output shaft housing bore 9 is designed in such a way as to allow the engagement of a male type centering pilot. The two smaller attachment bores 6 at the torque arm ears 5a, 5b, together with the above-described output shaft housing bore 9 and pilot, provide the three necessary alignment and supporting points to allow the gearbox to be directly and simply bolted to the structure of the driven machinery. This arrangement serves as an integrated flange directly in the housing, thereby providing significant savings in mounting space.

For applications where traditional round flange mounting is preferred, the machined surface around the shaft housing bores 9 features a set of appropriately spaced, tapped bores 8 for easy attachment of a traditional round flange. The above-described centering pilot acts to secure the flange with the universal housing and provide proper alignment.

The assembly of the internal components of the gearbox is accomplished through a top cover 10, as well as through the bores for the input and output shafts 1, 2. The top cover 10 is designed to have its top surface below the mounting surfaces of the feet 3a. In addition, all of the mounting feet 3a, 3b, 3c are integral with the housing structure and provide the sole attachment surfaces for the housing structure. Consequently, the top cover 10 is not subjected to any external reaction or internal gearing forces. Thus, the housing structure is better protected against leakage of any type of internal lubricant.

Figure 2:
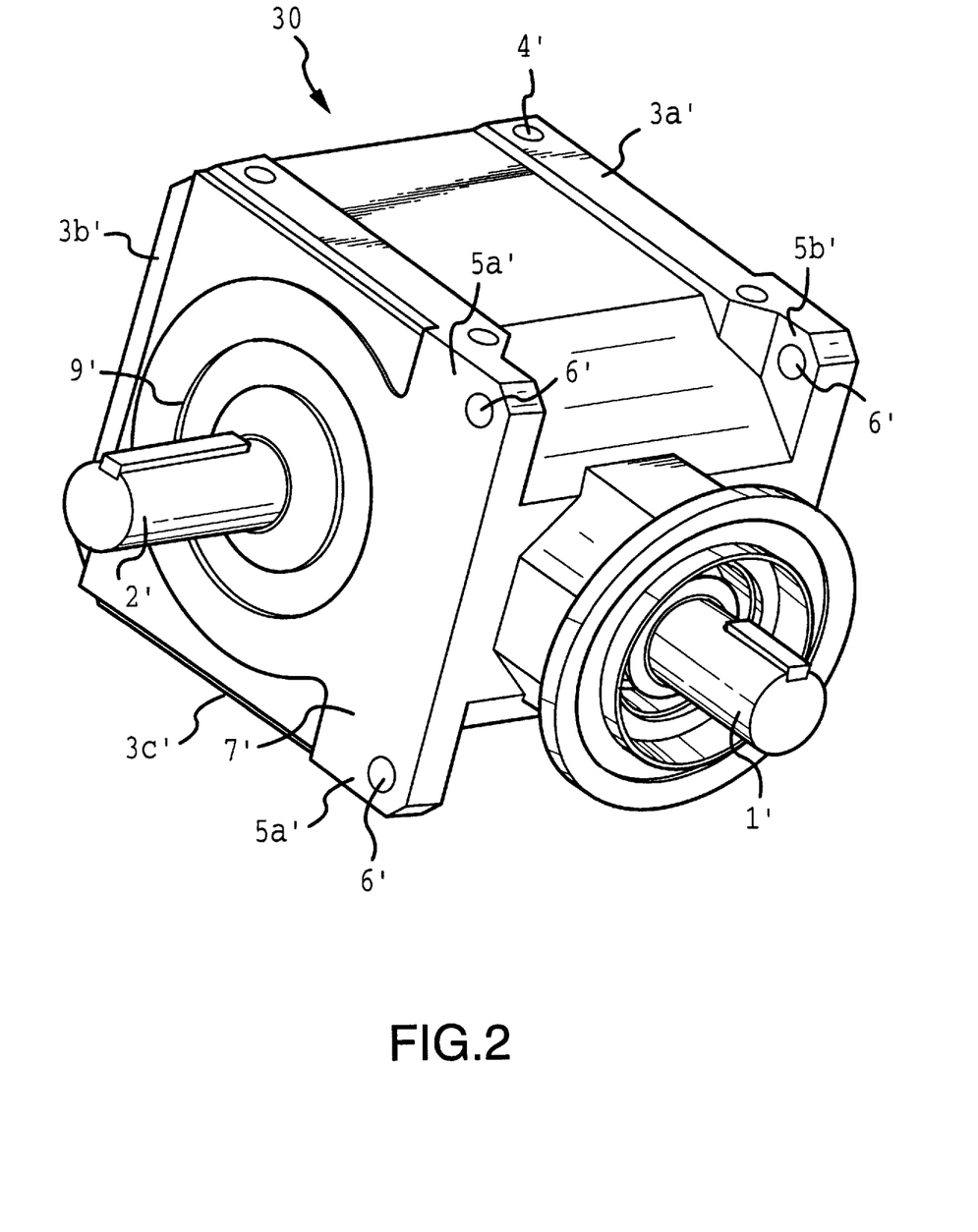
FIG. 2 is a perspective view of a right angle gearbox having a universal mount housing according to a second embodiment of the present invention, wherein bevel gears are used as the right angle gear stage.

FIG. 2 shows a right angle gearbox 30 having a housing configuration according to a second embodiment of the present invention. The right angle gearbox 30 utilizes bevel gears as the right angle gear stage. The housing configuration according to the second embodiment incorporates basically the same beneficial features found in the first embodiment, as described above. The primary difference is that the cover of the housing according to the second embodiment is opposite the input side of the gearbox. Furthermore, the centerlines of the input and output shafts 1', 2' are intersecting and not offset like in the worm gear type unit of the first embodiment shown in FIG. 1.

The housing of the gearbox 30 according to the second embodiment has a cubic-shaped design with integrated pairs of parallel, flat machined feet 3a', 3b', 3c' at the three major mounting sides of the housing. The feet 3a', 3b', 3c' have tapped bores 4', which provide easy attachment of the gearbox 30 to the structure of the driven machinery. The flat machined feet 3a', 3b', 3c' with the tapped bores 4' also provide an ideal attachment base for a variety of mounting brackets, base plates, torque arms, and other mounting hardware.

The housing of the gearbox 30 has two sets of ears 5a' and 5b' with bores 6' which function as torque arm attachment locations. Raised, machined surfaces 7' are provided on both output side faces of the housing of the gearbox 30 around the output shaft housing bore 9' over to both ears 5a', 5b'.

For those skilled in the art it will be obvious that the herein presented invention integrates beneficial mounting features in one housing, thereby allowing an extremely flexible mounting of the right angle drive for whatever type of gear arrangement it may utilize. To further explain the benefit of the invention, FIGS. 3 to 7 illustrate some possible gearbox/gearmotor mounting configurations using the universal housing construction according to the present invention.

Figure 3:
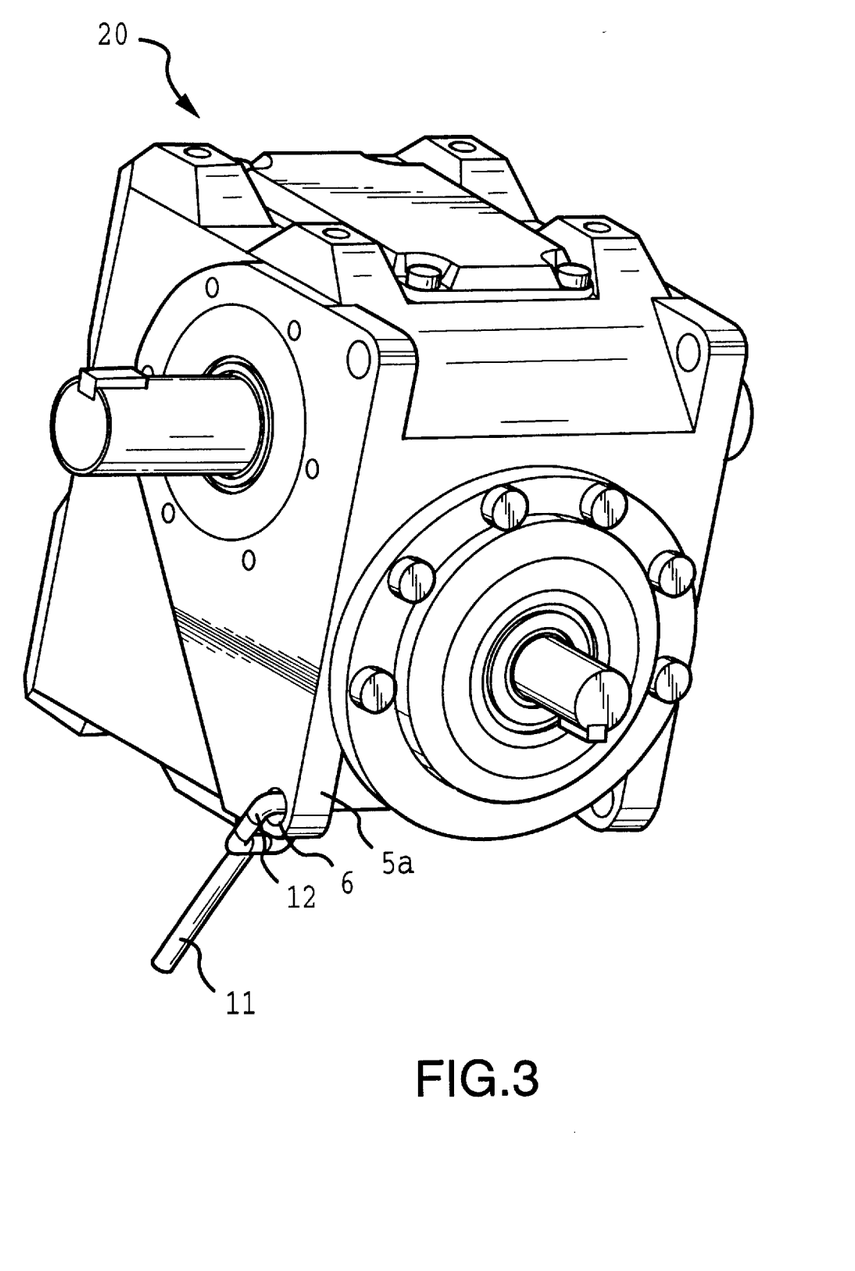
FIG. 3 is a perspective view of the right angle gearbox shown in FIG. 1 with a turn buckle type torque arm attachment.

FIG. 3 shows the right angle gearbox 20 according to the first embodiment of the present invention, with a turn buckle type torque arm 11 attached to one of the integrated torque arm ears 5a. The torque arm 11 has a turn buckle 12 that extends through the bore 6 of the integrated torque arm ear 5a. The integrated torque arm ear 5a thereby allows an easy attachment of the turn buckle type torque arm 11, without the need to remove housing bolts as is commonly done on conventional housing designs.

Figure 4:
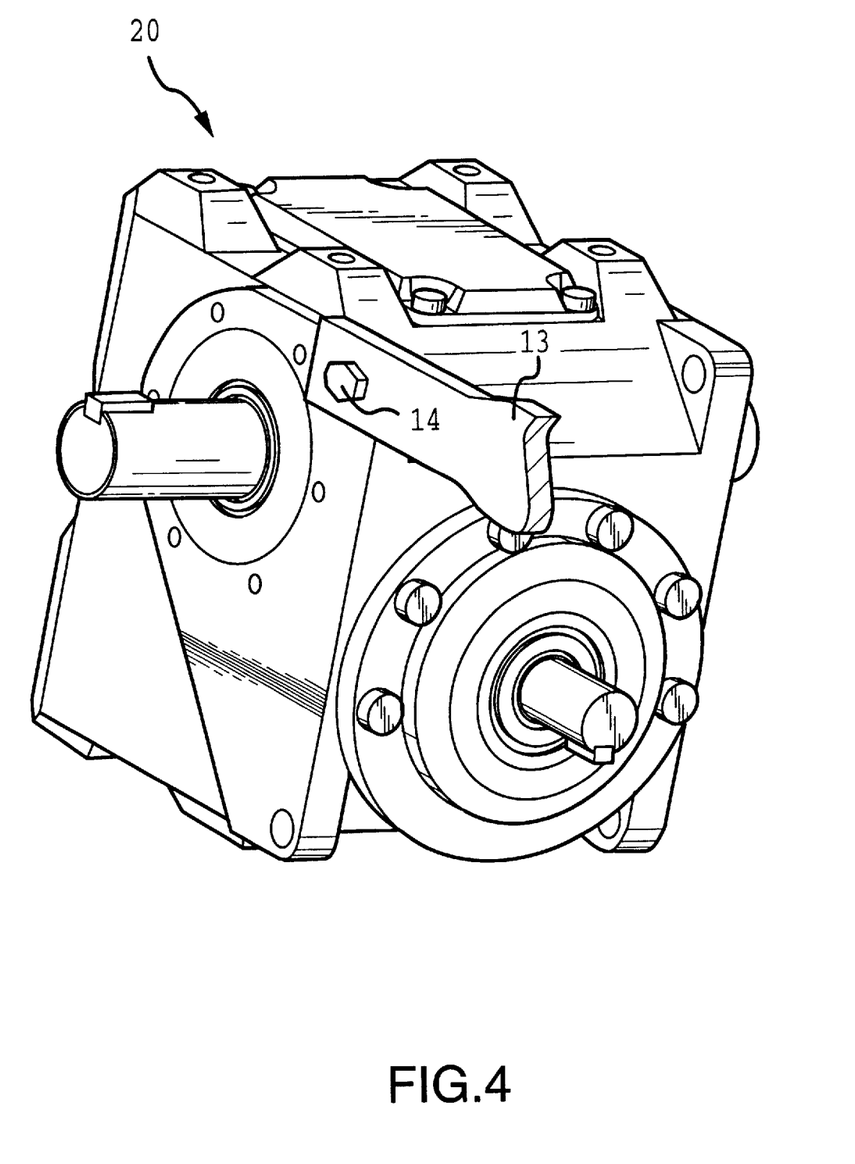
FIG. 4 is a perspective view of the right angle gearbox shown in FIG. 1 with a compact torque arm mounting arrangement.

FIG. 4 shows the right angle gearbox 20 according to the first embodiment of the present invention, with a torque arm mounting arrangement utilizing a simple extension plate 13 of the driven machinery structure attached to one of the integrated torque arm ears 5a by a simple bolt or pin 14. This provides a very compact mounting.

Figure 5:
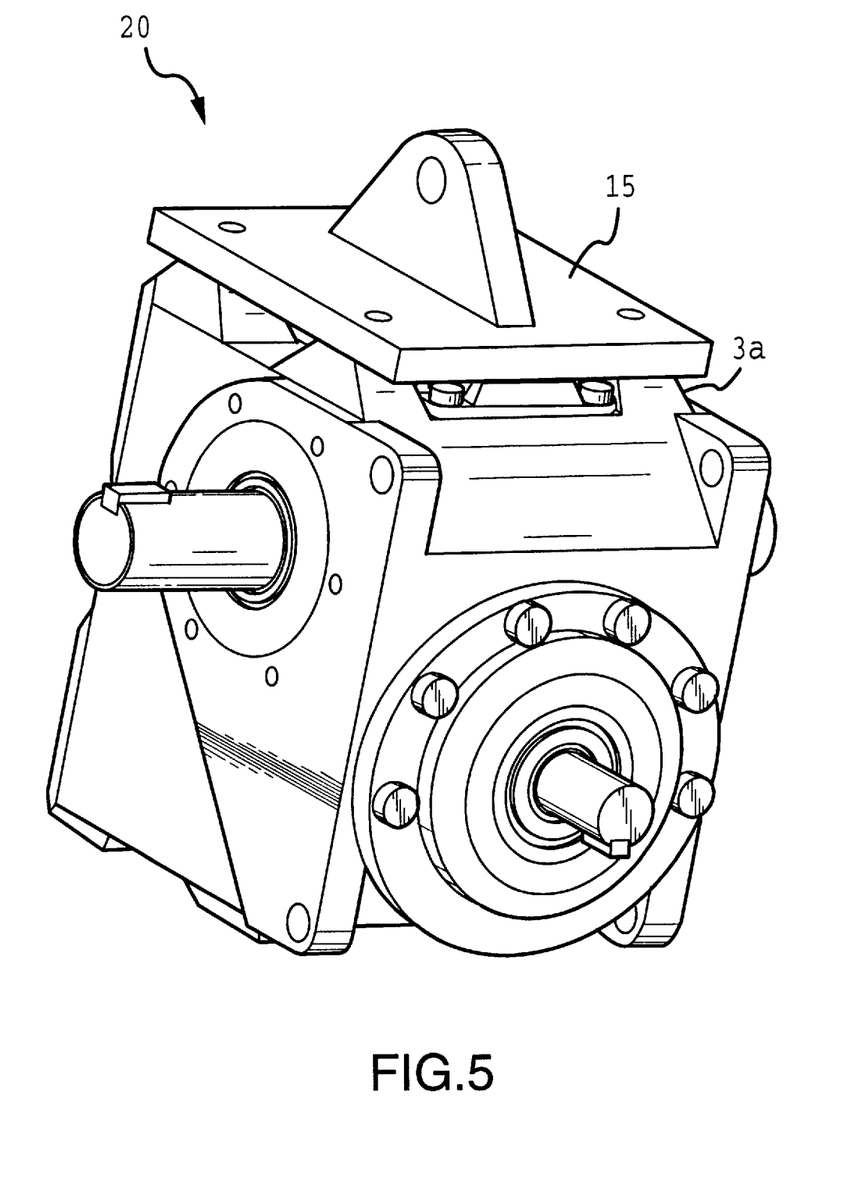
FIG. 5 is a perspective view of the right angle gearbox shown in FIG. 1, with a torque arm arrangement attached to the integrated feet at one side of the housing.

FIG. 5 shows a torque arm arrangement 15 attached to the feet 3a at one side of the universal mount gearbox housing. The same bolt hole pattern is preferably provided for all three sets of mounting feet 3a, 3b, 3c so that the same torque arm arrangement 15 can be mounted on any of the three mounting surfaces of the housing. This further increases the flexibility of the universal mount housing without requiring additional mechanical attachment devices.

Figure 6:
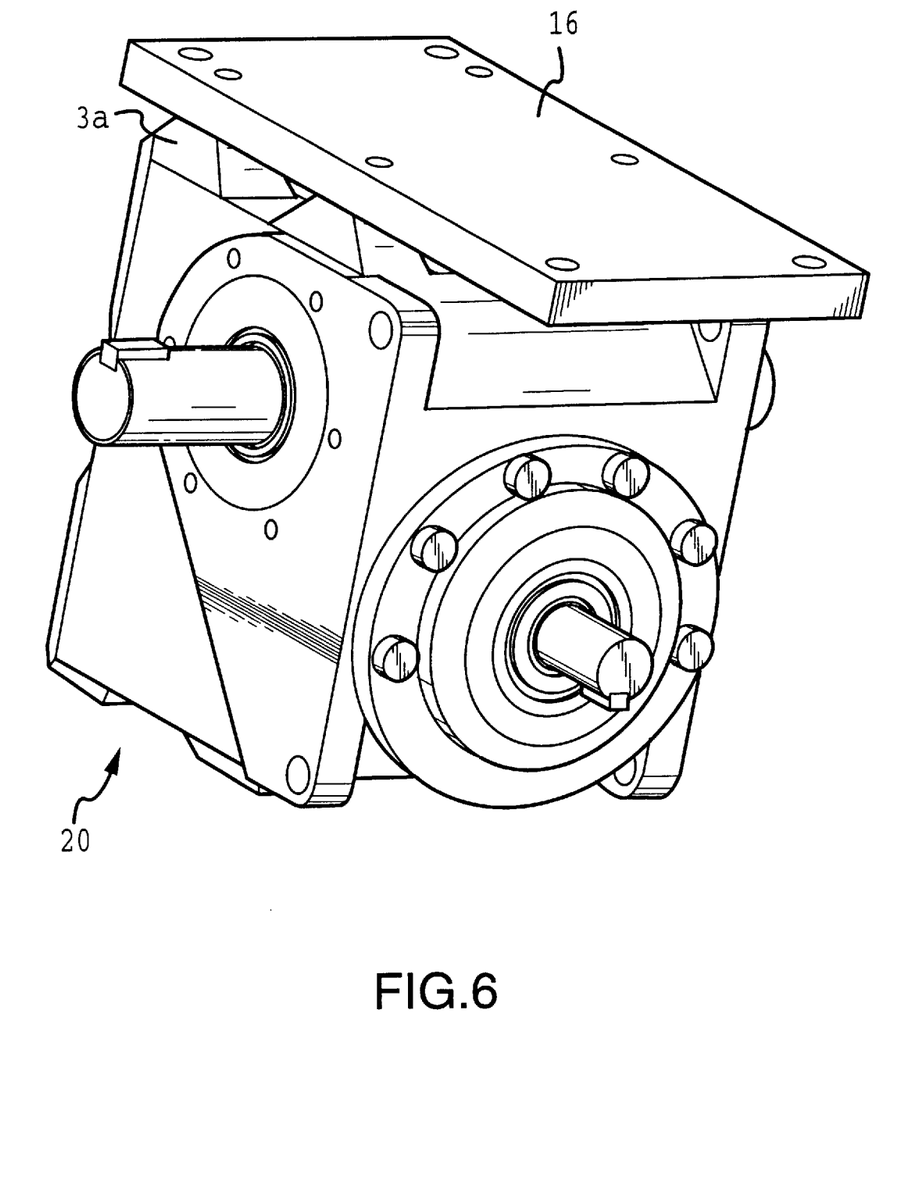
FIG. 6 is a perspective view of the right angle gearbox shown in FIG. 1, with a mounting plate attached to the integrated feet at one side of the housing.

FIG. 6 depicts the attachment of a mounting plate 16 to the universal mount housing (or the universal mount housing to a base plate). The mounting plate 16 utilizes the tapped bores 4 on the integrated feet 3a. Here again, the same mounting plate 16 can be used on all three mounting surfaces of the housing by providing the same bolt hole pattern for the integrated feet 3a on all sides.

Figure 7:
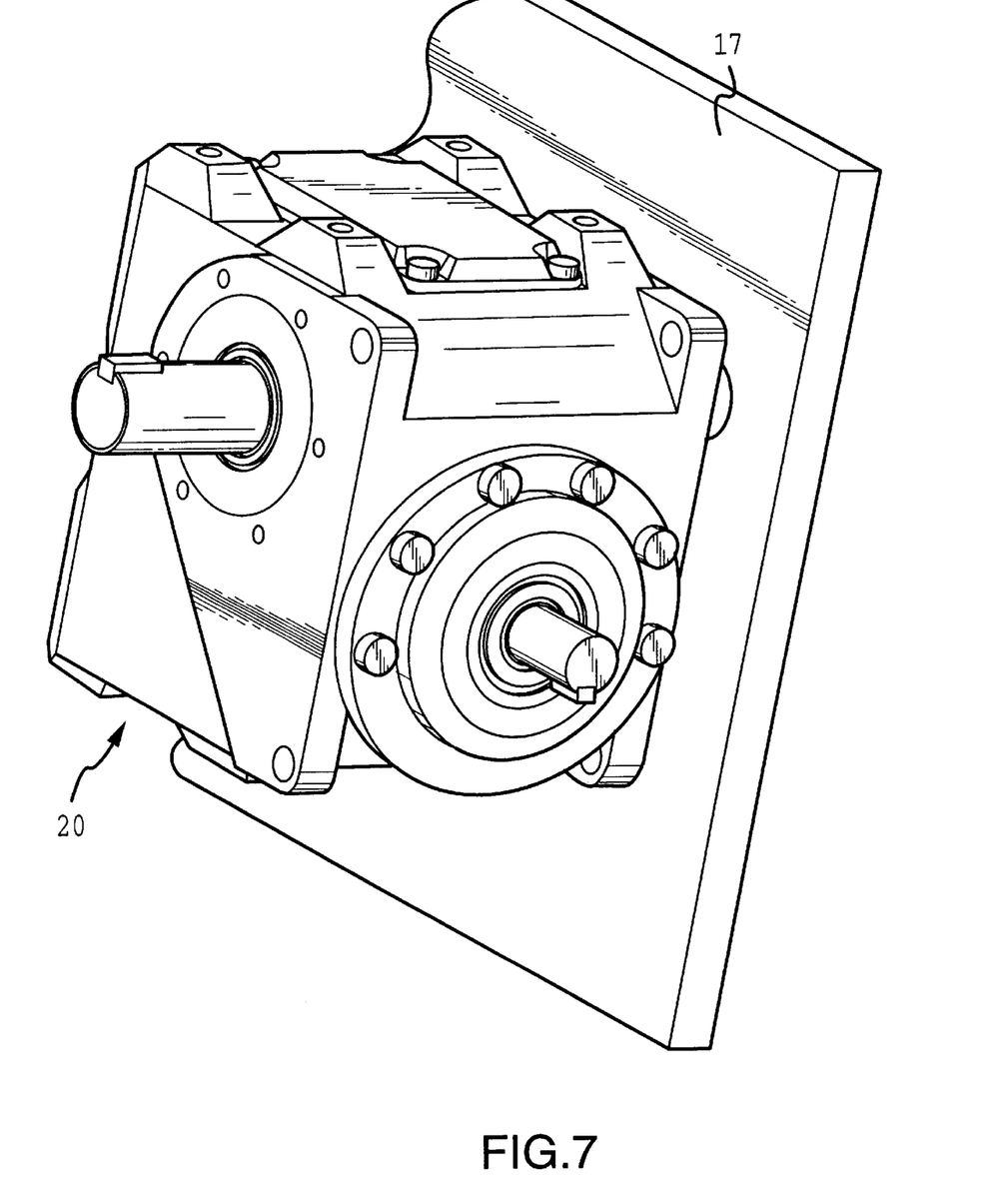
FIG. 7 is a perspective view of the right angle gearbox shown in FIG. 1, with the drive attached directly to the driven structure by utilizing the raised, machined surface and defined attachment points at the output side of the gearbox.

FIG. 7 shows a mounting configuration where the driving structure is attached directly to the driven structure 17 by utilizing the raised, machined surface 7 at the output side of the gearbox 20 along with the three defined attachment points; namely the centering pilot/bore contact and two bolts mounted through the bores 6 in the integrated torque arm ears 5b.

As will be apparent to those skilled in the art, many other mounting arrangements not listed here are possible with the universal mount housing construction according to the present invention.

It should be noted that while the present invention has been described and illustrated by reference to a right angle gearbox, the invention is equally applicable to a right angle gearmotor. The terms gearbox and gearmotor are used interchangeably throughout the specification and claims of this application.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A universal mount housing for a right angle gearbox, comprising:
    a generally cubic-shaped housing body having an input opening for receiving a rotational power input and at least one output opening for transmitting a rotational power output, said output opening having a central axis which is perpendicular to a central axis of said input opening;
    a plurality of integrated raised feet provided on each of three sides of said housing body, said three sides of the housing body including a side of the housing body opposite to said input opening and perpendicular to said central axis of said input opening, and both sides of the housing body which are in planes parallel to both of said central axes of said input and output openings;
    at least one integrated, plate-shaped housing extension providing an integrated torque arm formed on a side of said housing body extending in a plane perpendicular to the central axis of the output opening, said housing extension having a through-bore formed therein; and
    a flat attachment surface formed on said housing body around said output opening said housing extension having a surface which is generally coplanar with said flat attachment surface.

2. The universal mount housing according to claim 1, wherein said raised feet each have a tapped bore formed therein.

3. The universal mount housing according to claim 2, wherein said tapped bores provide an identical bolt hole pattern on each of said three sides of said housing body.

4. The universal mount housing according to claim 1, wherein said at least one housing extension comprises a pair of integrated, plate-shaped housing extensions formed on two sides of said housing body, said two sides of said housing body extending in two respective planes which are perpendicular to the central axis of said output opening.

5. The universal mount housing according to claim 4, wherein each of said housing extensions provide an integrated torque arm having a through-bore formed therein for attachment purposes, each through-bore extending through a respective one of said housing extensions in a direction parallel to said central axis of said output opening.

6. The universal mount housing according to claim 5, wherein said flat attachment surface comprises a raised, machined surface formed in said housing body around said output opening and extending to the plate-shaped housing extensions.

7. The universal mount housing according to claim 6, further comprising a centering bore formed in said housing body concentric with said output opening, said centering bore providing, together with the through-bores in the plate-shaped housing extensions and the flat attachment surface, a flange type attachment.

8. The universal mount housing according to claim 1, further comprising a set of tapped bores provided in said flat attachment surface of said housing body around said output opening.

9. The universal mount housing according to claim 1, wherein said at least one housing extension provides an integrated torque arm having a through-bore formed therein for attachment purposes, said through-bore extending through said at least one housing extension in a direction parallel to said central axis of said output opening.

10. The universal mount housing according to claim 9, further comprising a set of tapped bores provided in said flat attachment surface of said housing body around said output opening.

11. A universal mount housing for a right angle gearbox, comprising:

a generally cubic-shaped housing body having an input opening for receiving a rotational power input and at least a first output opening for transmitting a rotational power output, said first output opening having a central axis which is perpendicular to a central axis of said input opening;

a plurality of integrated, raised feet provided on each of three sides of said housing body, said three sides of the housing body including a side of the housing body opposite to said input opening and perpendicular to said central axis of said input opening, and both sides of the housing body which are in planes parallel to both of said central axes of said input opening and said first output opening, said raised feet each having a tapped bore formed therein, said tapped bores providing an identical bolt hole pattern on each of said three sides of said housing body;

a first pair of integrated, plate-shaped housing extensions formed on a side of said housing body which is perpendicular to the central axis of said first output opening, each of said housing extensions providing an integrated torque arm having a through-bore formed therein for attachment purposes; and an integrated, raised surface formed in said housing body around said first output opening and extending to the first pair of plate-shaped housing extensions, said raised surface providing a first flat attachment surface which is generally coplanar with a flat surface of said first pair of plate-shaped housing extensions, and a set of tapped bores provided in said raised surface of said housing body around said output opening.

12. The universal mount housing according to claim 11, wherein said housing body further comprises a second output opening formed in a side of said housing body opposite said first output opening, said second output opening is coaxial with said first output opening, a second flat attachment surface is formed in said housing body surrounding said second output opening, and a second pair of plate-shaped housing extensions are formed on said housing body, each of said second pair of plate-shaped housing extensions having a flat surface that is generally coplanar with said second flat attachment surface.

13. The universal mount housing according to claim 11, wherein the through bores formed in each of said housing extensions extend in a direction parallel with said central axis of said first output opening.

* * * * *